US007016060B1

(12) United States Patent
Carney et al.

(10) Patent No.: US 7,016,060 B1
(45) Date of Patent: Mar. 21, 2006

(54) METHOD, SYSTEM, AND PROGRAM FOR RECONFIGURING LOGICAL PRINTERS IN A NETWORK PRINTING SYSTEM

(75) Inventors: Dennis Michael Carney, Louisville, CO (US); Ryan Hoa Nguyen, Westminster, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/457,150

(22) Filed: Dec. 8, 1999

(51) Int. Cl.
 G06F 15/00 (2006.01)
 G06F 15/16 (2006.01)

(52) U.S. Cl. ............... 358/1.15; 358/1.15; 709/203

(58) Field of Classification Search ........... 358/1.15, 358/1.14, 1.9, 1.13; 710/8; 709/220, 203, 709/219
 See application file for complete search history.

(56) References Cited

U.S. PATENT DOCUMENTS

| | | | |
|---|---|---|---|
| 5,602,974 A | | 2/1997 | Shaw et al. |
| 5,678,044 A | | 10/1997 | Pastilha et al. |
| 5,692,111 A | | 11/1997 | Marbry et al. |
| 5,699,495 A | | 12/1997 | Snipp |
| 5,708,812 A | | 1/1998 | Van Dyke et al. |
| 5,742,825 A | | 4/1998 | Mathur et al. |
| 5,819,112 A | | 10/1998 | Kusters |
| 5,845,058 A | | 12/1998 | Shaw et al. |
| 5,903,716 A | * | 5/1999 | Kimber et al. ............. 358/1.13 |
| 5,978,560 A | * | 11/1999 | Tan et al. .................. 358/1.15 |
| 6,075,615 A | * | 6/2000 | Nakamura ................. 358/1.14 |
| 6,088,120 A | * | 7/2000 | Shibusawa et al. ........ 358/1.15 |
| 6,112,256 A | * | 8/2000 | Goffinet et al. ................ 710/8 |
| 6,301,012 B1 | * | 10/2001 | White et al. ............... 358/1.15 |
| 6,321,258 B1 | * | 11/2001 | Stollfus et al. ............. 709/220 |
| 6,606,165 B1 | * | 8/2003 | Barry et al. ................. 358/1.9 |

OTHER PUBLICATIONS

U.S. Appl. No. 09/348,251, filed Jul. 7, 1999.
U.S. Appl. No. 09/349,056, filed Jul. 7, 1999.
U.S. Appl. No. 09/348,966, filed Jul. 7, 1999.
U.S. Appl. No. 09/348,358, filed Jul. 7, 1999.
Jacobs, John. Windows NT Printing: Flow of Control. Microsoft TechNet, vol. 4, Issue 9, Sep. 1999 [online], [retrieved on Nov. 7, 1999]. Retrieved from the Internet <URL: http://technet.microsoft.com/cdonline/content/complete/windows/winnt/winntas/technote/teroubleshooting.>.
Microsoft Corporation. Windows NT Printing Model. Microsoft Corporation, (c) 2000 [online], [retrieved on Jun. 2, 2000]. Retrieved from the Internet <URL: http://msdn-.microsoft.com/library/winresource/dnwinnt/S83B1.HTM> [Available on the Internet before Dec. 1999].
McLaughlin III, Leo J. Line Printer Daemon Protocol. Network Printing Working Group, rfc1179, Aug. 1990 [online], [Retrieved on Jun. 2, 1000].
Microsoft Corporation. Windows NT Printer Drivers. Microsoft Corporation, (c) 2000 [online], [retrievd on Jun. 2, 2000] [Available on the Internet before Dec. 1999].

* cited by examiner

Primary Examiner—Kimberly Williams
Assistant Examiner—Saeid Ebrahimi-Dehkordy
(74) Attorney, Agent, or Firm—David W. Victor; Konrad Raynes & Victor LLP

(57) ABSTRACT

Disclosed is a method, system, and program for reconfiguring multiple logical printers from using a first monitor program to using a second monitor program to communicate with one physical printer. The monitor program submits print jobs directed to a logical printer to one associated physical printer over a network. At least one physical printer is associated with each logical printer. A determination is made of a plurality of logical printers and whether each physical printer associated with each of the plurality of logical printers is of a particular class. An indication is made in a data structure of each logical printer associated with one physical printer of the particular class. Each of the plurality of logical printers indicated in the data structure is reconfigured to use the second monitor program to submit print jobs to one physical printer of the particular class.

27 Claims, 6 Drawing Sheets

The Printer Ports window

The Installing Print Monitor window

The Printer Ports window immediately after installation

The New Port Options window

METHOD, SYSTEM, AND PROGRAM FOR RECONFIGURING LOGICAL PRINTERS IN A NETWORK PRINTING SYSTEM

CROSS-REFERENCE TO RELATED APPLICATIONS

This application is related to the co-pending and commonly-assigned patent application having U.S. Ser. No. 09/457,150, filed on the same date herewith, entitled "Method, System, Program, and Data Structures For Reconfiguring Output Devices in a Network System," and which is incorporated herein by reference in its entirety.

BACKGROUND OF THE INVENTION

1. Field of the Invention

The present invention relates to a method, system, and program for reconfiguring a printer object in a network printing system.

2. Description of the Related Art

Network printing systems generally comprise an assemblage of different printers, client computers, servers, and other components connected over a network. A network administrator or user may want to monitor the status of print jobs being printed or the general operational status of the printer. A computer may monitor a remote printer over a network using a network protocol, such as SNMP or TCP/IP, or a line connection such as a parallel port connection.

In a Microsoft Windows NT environment, a client application interfaces with a printer object, also known as a logical printer. The printer object is a software interface to which a driver, output port, and configuration settings are associated. The port provides an interface to a physical printer, which may be a serial, parallel, or network printer. One printer object can be associated with multiple ports. In such case, when submitting a print job to a print object with multiple ports, one of the ports is selected to handle the job.

The client submits a print job, specifying a print object for the print job, to a spooler. The spooler may queue multiple print jobs. When processing a print job, the spooler would determine an available port for the print object, which may have multiple ports. Associated with every port is a port monitor program, such as Local, Macintosh, HP, and line printer daemon protocol (LPR). The LPR port monitor uses the TCP/IP protocol and is typically used to transmit print jobs to network printers over a TCP/IP network. The spooler submits the job to the port monitor for the port. The LPR port monitor maintains information on the IP address or host name of the printers attached to the ports. When the spooler submits the job to one port associated with the printer object, the LPR port monitor submits the job over the network to the printer device having the IP address associated with the port the spooler selected. If multiple ports are associated with a single printer object, then the spooler may select another port if a previous selected port for the print job failed.

In order to utilize a different port monitor device to submit print jobs to printers in a Windows environment, a user must first open the "Printers" window shown in FIG. 1a. This window in FIG. 1a shows one printer object, "Network Printer". To change the port monitor the Network Printer uses, the user would have to perform several GUI actions to first add a network port and enter a network IP address of the printer. To open the window in FIG. 1b to make changes for a particular print object displayed in FIG. 1a, the user would right click the mouse over the printer object, choose "Properties" out of the pop-up menu, and then choose the Ports Tab. To add a port, the user would then select the "Add Port" button in FIG. 1b. Selection of this button causes the spooler to call the port monitor to put up the Add Port window in which the user may add a port. After adding the port, the port monitor returns control to the spooler which then updates internal data structures to reflect the added port and returns to FIG. 1b. Upon control returning to FIG. 1b, the user may then associate the printer object for which the window in FIG. 1b is open with one port, which may be the new port.

In large network environments there may be hundreds of printers. Thus, in order to change the port monitor for all network printers, the network administrator would have to go through the above described GUI steps to add a port for the new port monitor to each printer object and then reconfigure each printer object to use the new port.

Thus, there is a need in the art for an improved method, system, and program to associate new port monitors with printer objects.

SUMMARY OF THE PREFERRED EMBODIMENTS

To overcome the limitations in the prior art described above, preferred embodiments disclose a method, system, and program for reconfiguring multiple logical printers from using a first monitor program to using a second monitor program to communicate with one physical printer. The monitor program submits print jobs directed to a logical printer to one associated physical printer over a network. At least one physical printer is associated with each logical printer. A determination is made of a plurality of logical printers and whether each physical printer associated with each of the plurality of logical printers is of a particular class. An indication is made in a data structure of each logical printer associated with one physical printer of the particular class. Each of the plurality of logical printers indicated in the data structure is reconfigured to use the second monitor program to submit print jobs to one physical printer of the particular class.

In further embodiments, a determination is made of a network address for each physical printer. Determining whether each physical printer is of a particular class comprises using the determined network address of each physical printer to request information from the physical printer over the network. The requested information indicates whether the physical printer is a member of the particular class.

In still further embodiments, a port object provides an interface to a physical printer. Each logical printer is associated with one port object to interface with one physical printer and the port monitor is associated with the port object. Each of the plurality of logical printers is reconfigured to use the second monitor program and one port object associated with the second port monitor to submit print jobs. In such embodiments, reconfiguring the plurality of logical printers may comprise creating a new port associated with the second monitor program for each logical printer and reconfiguring each of the logical printers indicated in the data structure to use the new port for printing.

Preferred embodiments provide a mechanism for automatically reconfiguring multiple logical printers, i.e., printer objects, to use a new port monitor program to communicate with physical printers over a network. In prior art printer managements systems, such as the Microsoft Windows NT server, the network administrator would have to proceed through a series of GUI panels to separately reconfigure each printer to use a new port monitor program. This process can be especially tedious if the network administrator needed to reconfigure numerous printers of a particular class to use the new port monitor. With the preferred embodiments, a migration program automatically detects all printers of the particular class, e.g., IBM printers, and then automatically reconfigures the logical printers that utilize the printers of the particular class to use a new or different port monitor program. Preferred embodiments avoid the need to separately reconfigure each logical printer by proceeding through a series of GUI panels.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 2:
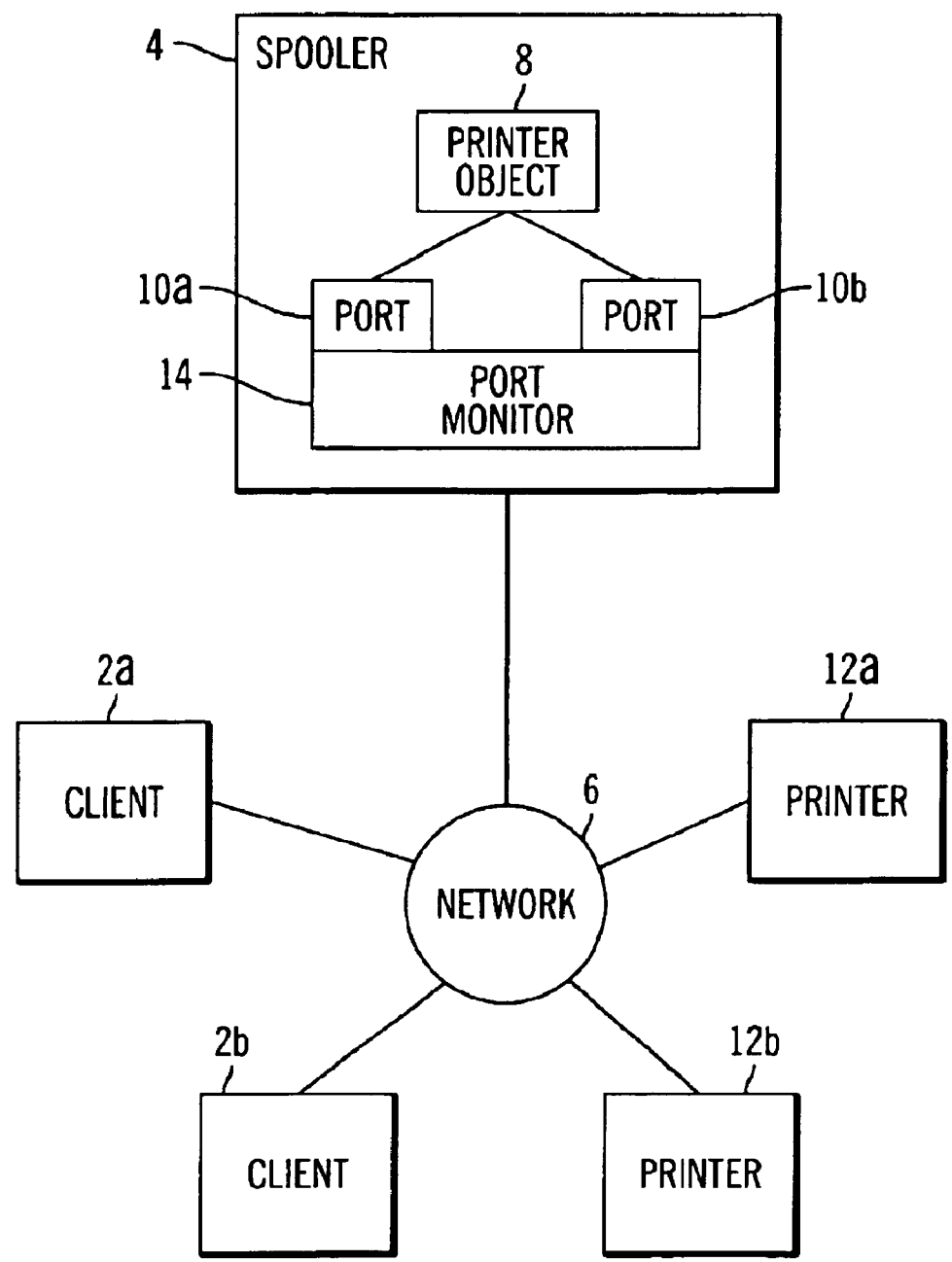
FIG. 2 is a block diagram illustrating a network computing environment in which preferred embodiments of the present invention are implemented.

FIG. 2 illustrates a network computing environment in which preferred embodiments are implemented. Client computers 2a, b, which may comprise any computing device in the art, would submit a print job to a logical printer represented by a print object. The clients 2a, b submit the print job to a spooler 4, which may be implemented in a server, such as a Microsoft Windows NT system. The spooler 4 queues print jobs submitted to each printer object. Print jobs are communicated over a network 6, which in preferred embodiments utilizes a TCP/IP protocol to communicate between devices. FIG. 2 shows the spooler 4 as having only one printer object 8, when in fact the spooler 4 may maintain multiple printer objects. The printer object 8 comprises the representation of a logical printer in the system to which applications running in the clients 2a, b print. Each printer object 8 is associated with one or more ports 10a, b. As discussed, the ports provide a representation of the physical connection to an actual printer. Thus, ports 10a, b represent the connection between the printer object 8 and printers 12a, b, respectively. Each port is associated with a port monitor 14. The port monitor 14 is a program that submits the print job to the printer 12a, b associated with the port the spooler 4 selects for printing. The port monitor 14 may also manage and monitor communication with the printer 12a, b, including monitoring the progress of submitted print jobs. FIG. 2 shows one port monitor 14 for both ports 10a, b. However, in alternative embodiments each port for a printer object 8 can have different port monitors associated with it.

Preferred embodiments are implemented in a Microsoft Windows network environment, wherein the spooler 4 is implemented in a Microsoft Windows NT print server, e.g., an NT workstation or server, and the clients 2a, b utilize Microsoft Windows 95/98 or NT.

Figure 1A:
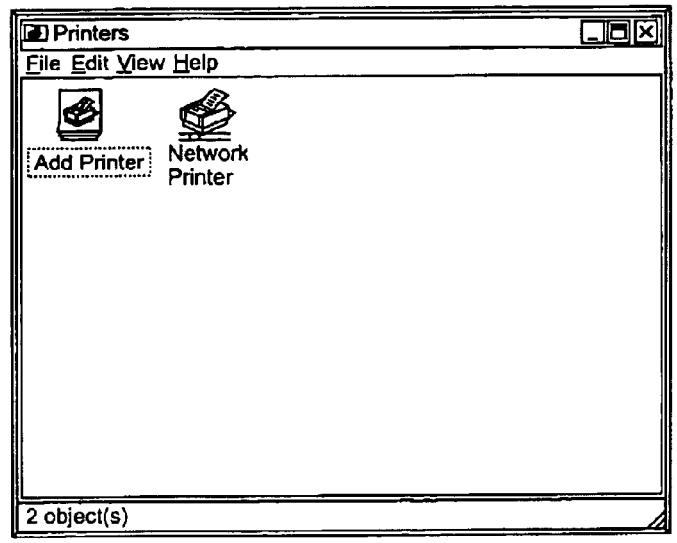
FIGS. 1a and 1b illustrate graphical user interface (GUI) windows used in the art for reconfiguring the port monitor associated with a printer object.
Figure 1B:
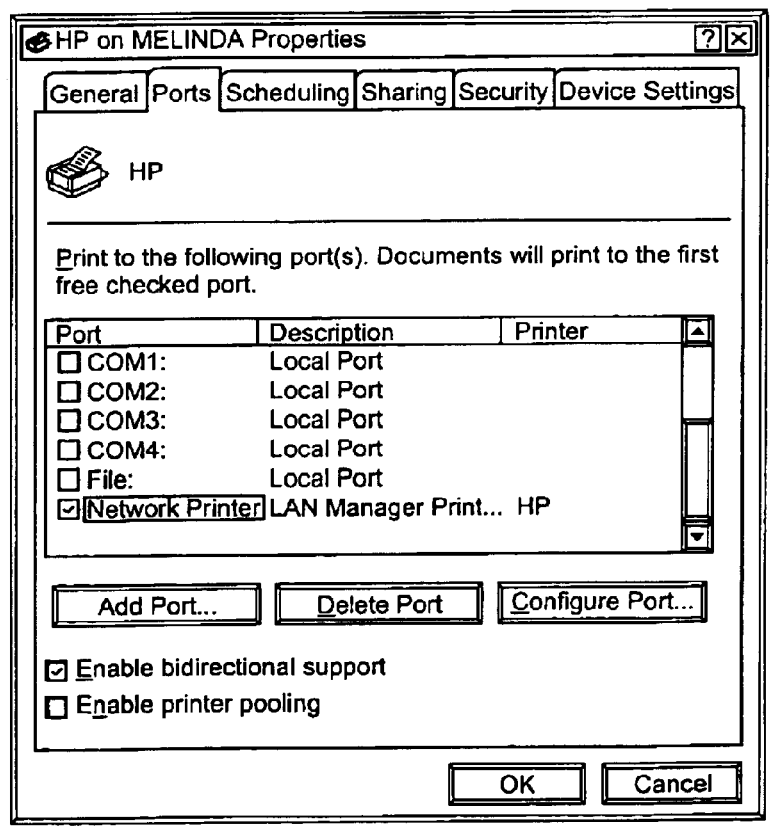
Figure 3A:
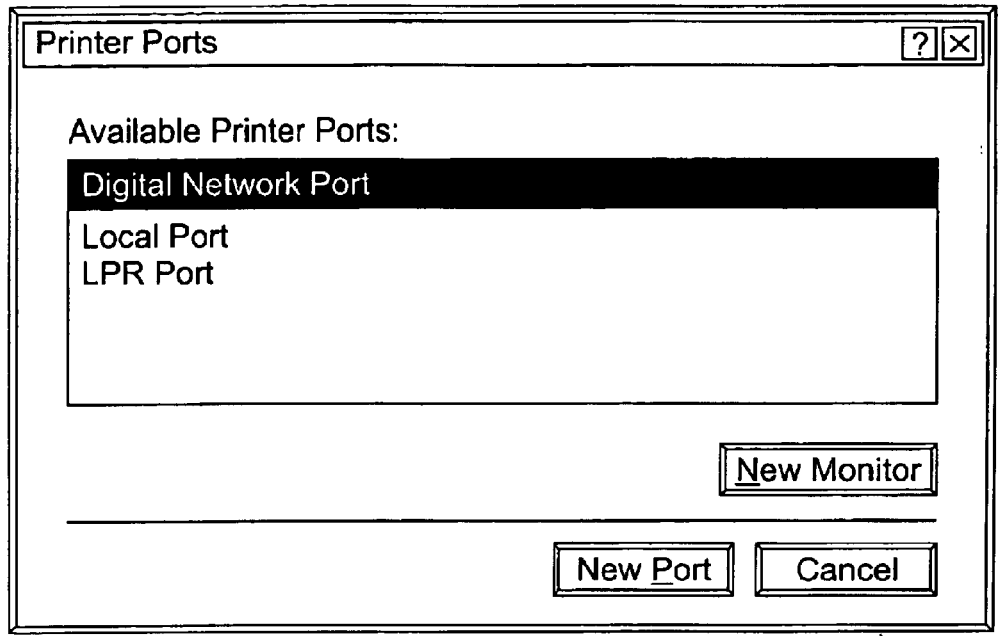
FIGS. 3a, b, c, d illustrate GUI panels a user would utilize to invoke the migration program to reconfigure logical printers to use the new port monitor.
Figure 3B:
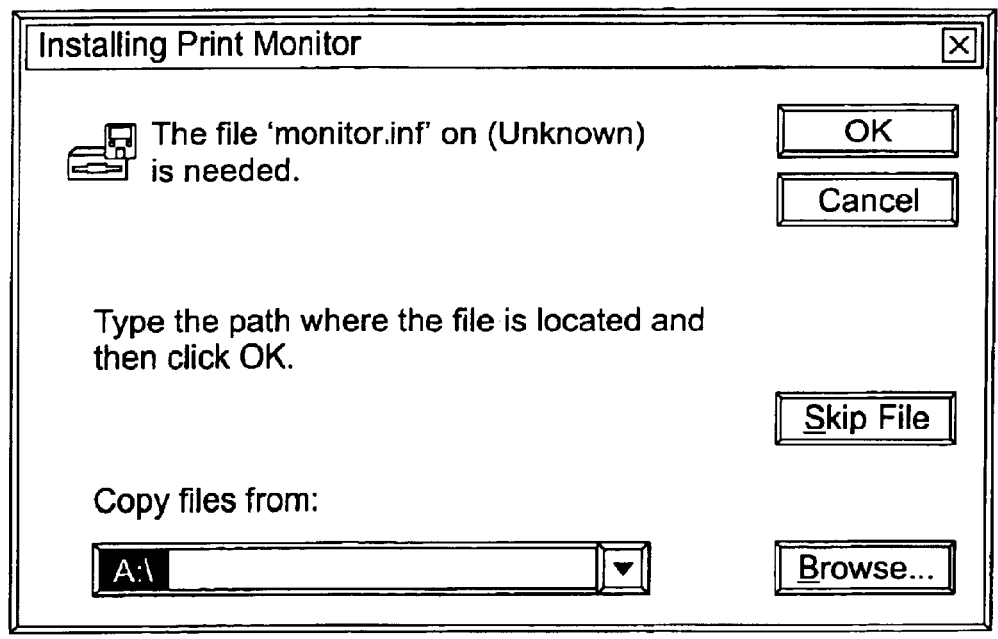

Preferred embodiments provide an improved algorithm to migrate all current printers of a particular class, such as all IBM printers, to use a new network port monitor to replace the LPR port monitor, such as the IBM TCP/IP Network Port Monitor described in the copending and commonly assigned patent application entitled "Method, System, and Program for Monitoring a Device with a Computer Using User Selected Monitoring Settings," having U.S. patent Ser. No. 09/348,358 and filed on Jul. 7, 1999. First the new port monitor would be installed as part of the standard Windows NT Add Printer process. For instance, from the window in FIG. 1b, the user would select the "Add Port" button, which would display the Printer Ports window shown in FIG. 3a. The new IBM TCP/IP Network Port Monitor has not been installed as of the display of FIG. 3a, because FIG. 3a does not list the new port monitor in the "Available Printer Ports" window. To install the new port monitor, the user would select "New Monitor" which would display the window in FIG. 3b. In the "Copy files from" entry field in FIG. 3b, the user would enter the directory where the port monitor files are located.

Figure 3C:
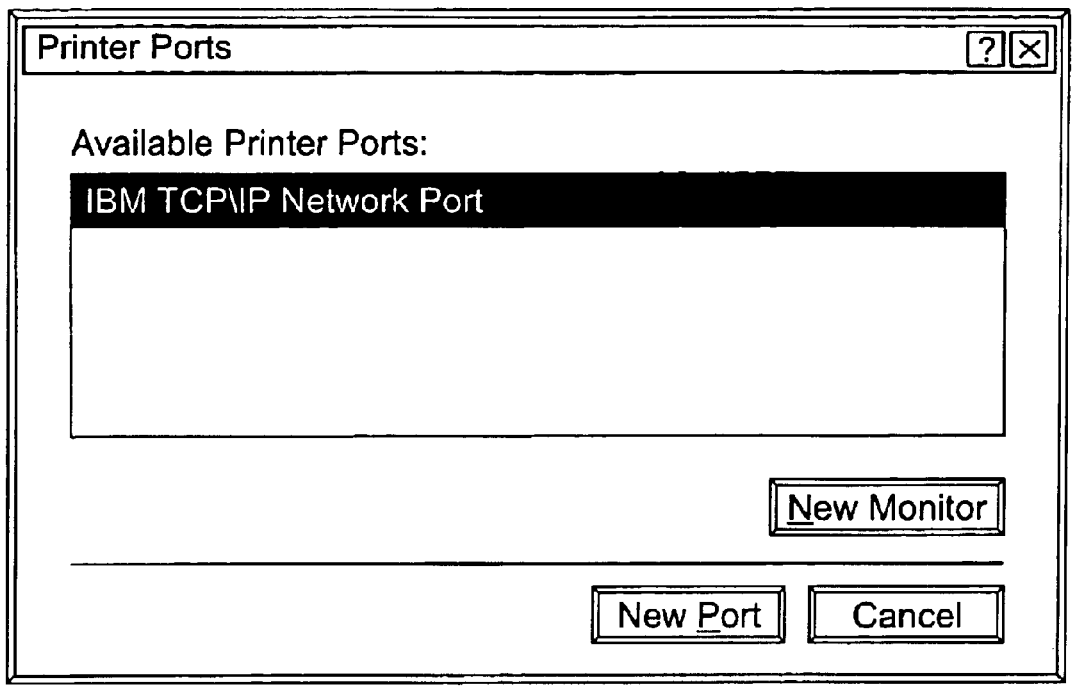

After selecting OK, the Printer Ports window returns as shown in FIG. 3c, except now only the IBM TCP/IP Network Port Monitor is in the list. The other port monitors are not lost. They have only temporarily disappeared form this window as a result of the Windows NT 4.0 port monitor installation process and will return the next time the Printer Ports window is opened. To continue the installation, the user would click on "New Port . . . " to display the window in FIG. 3d. To invoke the migration routine, the user would select the third radio button to reconfigure all logical printers connecting to an IBM printer to use the new port monitor program.

Figure 3D:
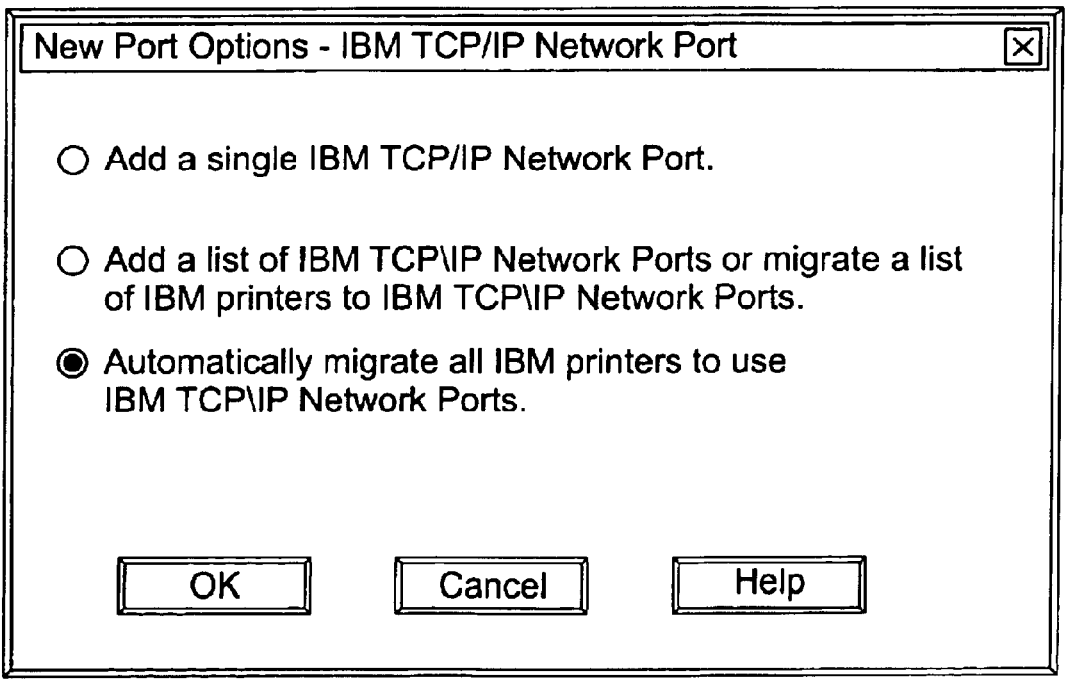
Figure 4:
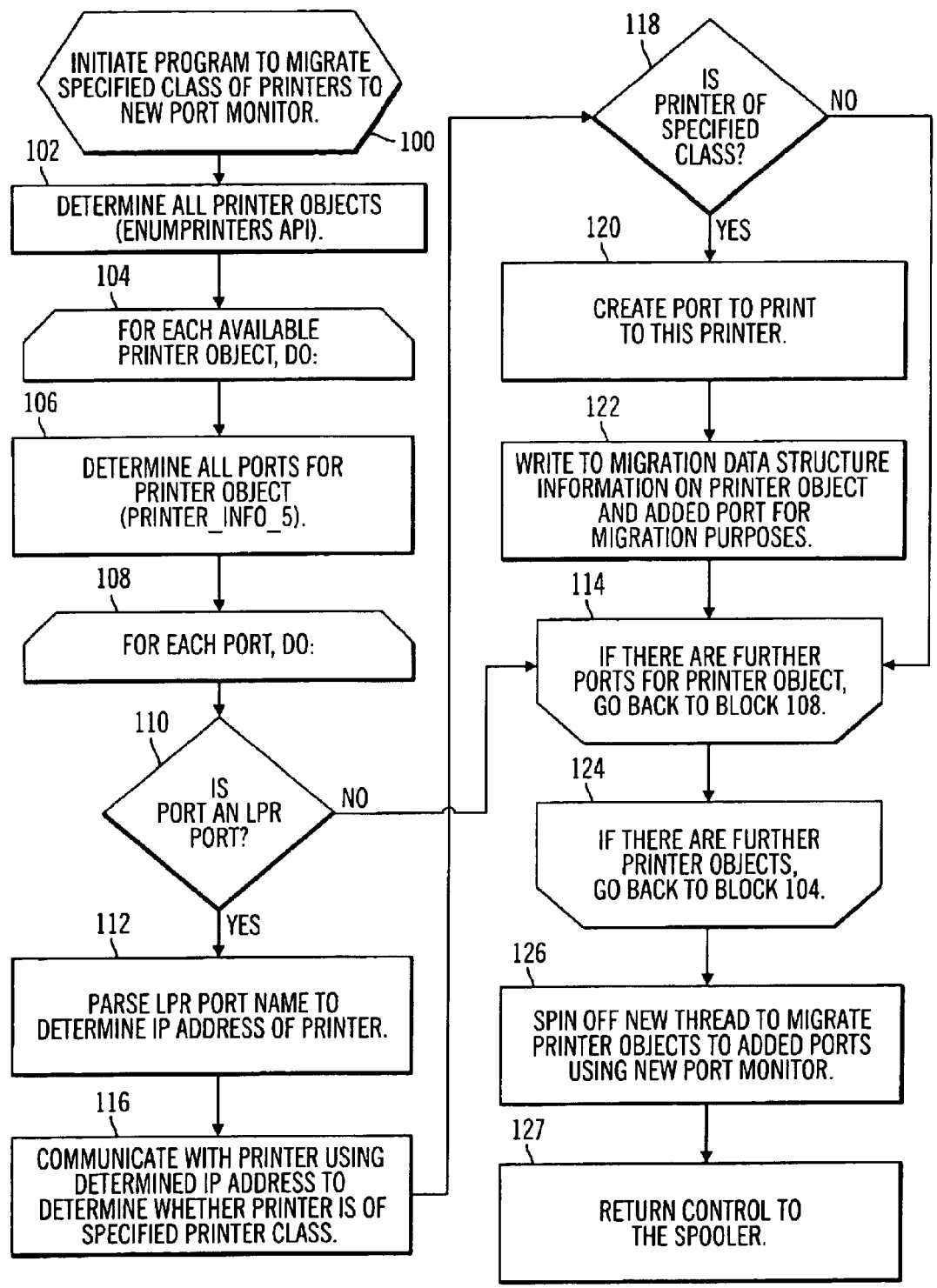
FIGS. 4 and 5 illustrate logic to change printer object settings to use a new port monitor program in accordance with preferred embodiments of the present invention.
Figure 5:
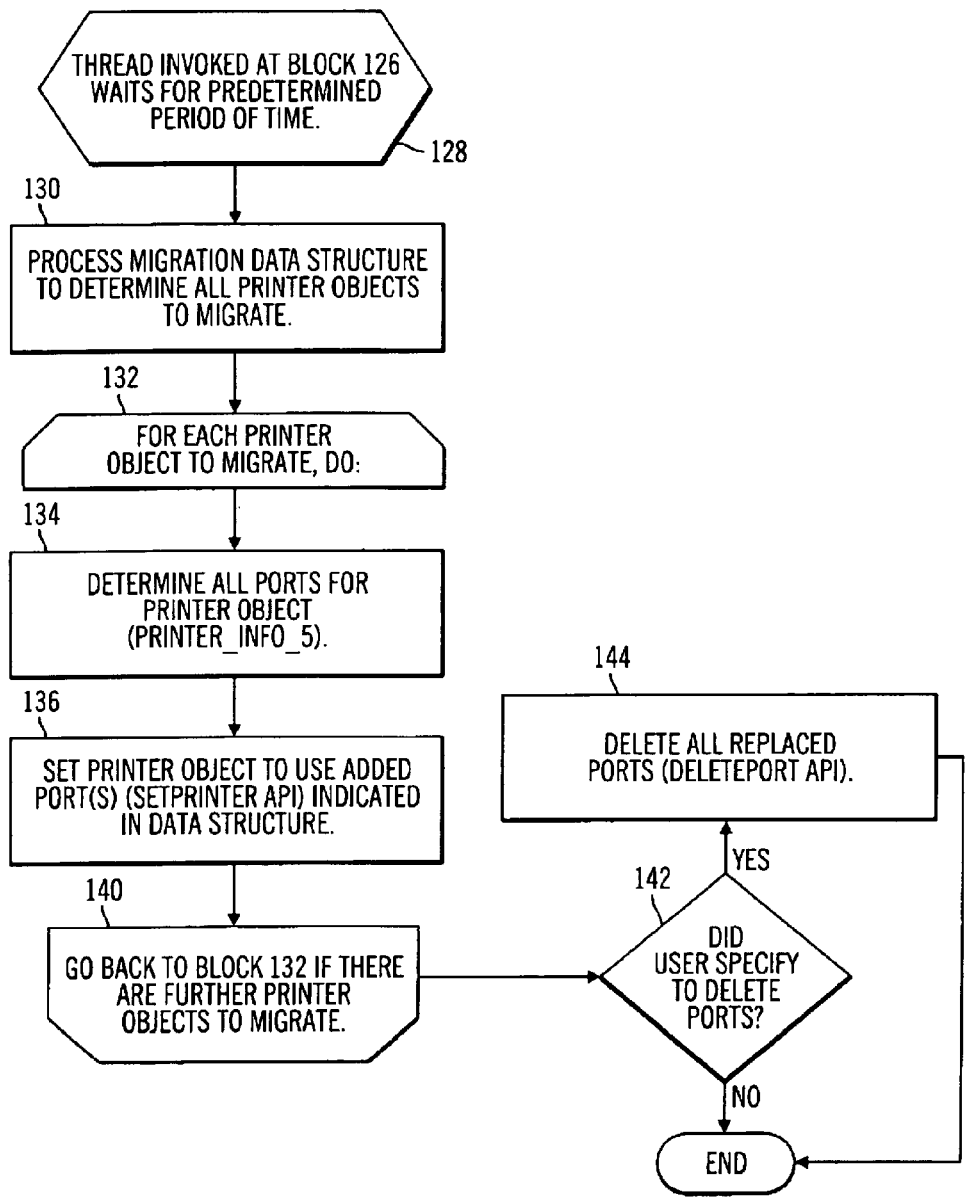

FIGS. 4 and 5 illustrate logic implemented in the new port monitor 14 that is invoked from the selection of migrate all printers in window FIG. 3d to automatically reconfigure all IBM printers to use the new port monitor. The Windows NT print subsystem is typically utilized from within the Windows NT system to reconfigure available printers. Preferred embodiments use standard Microsoft Windows and Windows NT printer API calls to access configuration information on available printer objects. Control begins at block 100 with a user or network administrator initiating a program to migrate a specified class of printers to a new port monitor by selecting such an option in the "Add Port" window. For instance, the IBM TCP/IP Network Port Monitor product may migrate all printer objects printing to IBM printers to itself. The port monitor 14 would determine (at block 102) all printer objects, e.g., print object 8, using the Windows printer function EnumPrinters API, which returns information on all available printer objects or printers, which are represented as printer icons in the Windows "Printers" window.

A loop begins at block 104 for each available printer object. Within this loop, the port monitor 14 determines (at block 106) all ports, e.g., ports 10a, b, for the printer object, which are maintained in the PRINTER_INFO_5 structure for the printer object. The PRINTER_INFO_5 structure is passed back from the EnumPrinters call. A nested loop begins at block 108 to consider each port for the given printer object being considered within the loop at block 104. For each port, the port monitor 14 determines (at block 110) whether the port is an LPR port. In further embodiments, the port monitor 14 may also determine whether the port is a network printer port other than LPR. If the port is an LPR port, then the port monitor 12 parses (at block 112) the LPR port name to determine the IP address or host name of the printer, e.g., printers 12a, b. In current implementations, the name of the LPR port incorporates at a fixed position the IP address of the printer associated with the LPR port. If the printer is not an LPR port, then control proceeds to block 114 to loop back to block 108 if there are further ports for the printer object.

The port monitor communicates (at block 116) with the printer at the determined IP address to determine (at block 118) whether the printer is of a particular class of printers, e.g., IBM printers. If the printer is of the specified class, then the port monitor 14 adds (at block 120) a port for the printer. The port monitor 14 then writes (at block 122) information on the added port and the printer object that will use the added port to a migration data structure. This migration data structure, which may be a file, database table, etc., is later used to determine which printer objects need to be modified to use the added port. Thus, the migration data structure indicates printer objects to modify and the new port for each printer object to set. If there are further ports for the printer object to consider, then (at block 114) control proceeds back to block 108 to consider whether the next port for the printer object is associated with a printer of the specified class, e.g., an IBM printer. After considering all ports for a given printer object, control proceeds to block 124 where the port monitor 14 proceeds back to block 104 if there are further available printer objects to consider. If all printer objects and ports have been considered, then control proceeds to block 126.

The result of the logic of blocks 100–124 is to create new ports using the new port monitor to communicate with printers of the specified class and build a migration data structure indicating each printer object that needs to have its properties changed to use the new ports. In Windows NT, after the AddPort process returns control to the spooler 4, the spooler 4 updates its internal structures to include information on the new ports. Because the spooler 4 does not recognize the new ports until control is returned from the AddPort process, the migration program needs to initiate a new thread to reconfigure printer objects to use the new ports. At block 126, the port monitor 14 invokes a new thread to perform migration functions and then returns (at block 127) control to the spooler. Before executing, the new thread invoked at block 126 waits (at block 128) for a predetermined period of time to provide the spooler 4 sufficient time to update its internal data structures to recognize the new ports. Otherwise, without this delay to provide the spooler 4 time to update its files, the spooler 4 does not recognize the new ports.

After waiting, the thread then processes (at block 130) the migration data structure to determine all printer objects whose ports must be set to one or more of the added ports for the new port monitor. A loop begins at block 132 for each printer object indicated in the migration data structure. Within this loop, the thread determines (at block 134) all ports for the printer object. This is determined from the previously retrieved PRINTER_INFO_5 data structure that includes information on the available ports for a printer object. The thread then configures (at block 136) the printer object to use the added port(s) indicated in the migration data structure using the Windows SetPrinter API. The thread then will return (at block 140) to block 132 if there are further printer objects to consider in the migration data structure. Otherwise, after all printer objects have been reconfigured to use the new ports having the new port monitor, the thread determines (at block 142) whether the user specified to delete old ports. If so, then the thread deletes (at block 144) all replaced ports, e.g., the LPR ports, indicated in the old port data structure using the DeletePort API and then terminates. Otherwise, the program ends.

Preferred embodiments thus provide a program to include in the Windows print subsystem to allow the user to switch all printers of a specific class, such as all IBM printers to new ports that use the IBM TCP/IP Network Port Monitor automatically, without requiring the network administrator to manually go through the printer manager dialog boxes to add a port, reassign a printer object to a new port, and delete ports. In this way, numerous printer objects can be migrated over to a new port monitor automatically, requiring only minimal user involvement. This is especially helpful in large network printing environments when there may be hundreds of printers that need to be configured to use a new port monitor. Without the preferred embodiment technique for reconfiguring printer objects, network administrators might be discouraged from utilizing new port monitor software given the time consuming and arduous task of having to reset the port monitor on all network printers using the Windows printer manager interface.

Conclusions And Alternative Embodiments

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to changing the monitor program used by a printer object to submit print jobs. However, the preferred embodiments may apply to programs that monitor a device attached to the network or computer, where the computer functions as the managing device and the managed object that is monitored may be any device known in the art capable of connecting to the computer directly, e.g., a parallel port or serial port, or through a network, such as an Intranet or the Internet. For instance, preferred embodiments could apply to monitoring facsimile machines, copiers, telephones, display devices, input/output devices, storage devices, communication systems, etc., in communication with the network system.

The preferred embodiment migration program is defined with respect to a Windows NT and 95/98 print subsystem environment. However, the preferred embodiments may apply to use with other print subsystems and operating systems using logical printers, i.e., the printer objects, mapping to physical printers, i.e., the ports, to change the settings of logical printers in the system to utilize new port monitor software.

Preferred embodiments utilize specific terms, such as printer object, port, port monitor, etc. that have specific meaning within the Microsoft Windows operating system.

However, such terms as used herein also refer to their general functional purpose. For instance, the term "printer object" may refer to any logical printer to which an application program prints, the term "port" may refer to any object that provides an interface connection between a selected logical printer and a physical printer, and the term "port monitor" may refer to any program that manages and monitors the connection between the logical printer and physical printer.

Preferred embodiments were described with respect to preexisting Windows printer API function calls. For instance, because currently there is no printer API call that can directly obtain the IP address of a printer, the preferred logic must parse the LPR port name, which includes the IP address, to determine the printer IP address. However, this logic could be modified if a Windows API function is added that directly determines the IP address of the printer object. In such case, there would be no need to parse the port name to determine the IP address of the physical printer.

The preferred embodiments may be utilized to reconfigure printer object ports other than the LPR port. For instance, with the Windows 2000 Standard TCP/IP Port Monitor (SPM), a user can specify any port name. However, the default port name, like LPR, includes the IP address or host name of the printer. Thus, the preferred logic of obtaining the IP address by parsing the port name may be used with the default SPM naming convention which incorporates the IP address in the name. The preferred logic could apply to any system where the IP address of the printer device is included in the name of the port.

The logic of FIGS. 4 and 5 is preferably implemented within the printer manager application that displays GUI windows through which the user may affect printer settings. However, various functions may be implemented in different application programs or in the operating system of the printer manager. This logic is for illustrative purposes. Additional or alternative steps may be performed in addition to those illustrated in the logic. Further, the order of the steps in the preferred logic may also vary.

In preferred embodiments, the migration program determines whether a printer is an IBM printer to determine whether to create a new port for the printer utilizing the IBM TCP/IP Network Port Monitor. In alternative embodiments, a determination may be made as to whether the printer is a member of a particular class of printers, wherein the class may indicate a type, model, manufacturer, speed, printing capabilities, etc.

In summary, preferred embodiments disclose a method, system, and program for reconfiguring multiple logical printers from using a first monitor program to using a second monitor program to communicate with one physical printer. The monitor program submits print jobs directed to a logical printer to one associated physical printer over a network. At least one physical printer is associated with each logical printer. A determination is made of a plurality of logical printers and whether each physical printer associated with each of the plurality of logical printers is of a particular class. An indication is made in a data structure of each logical printer associated with one physical printer of the particular class. Each of the plurality of logical printers indicated in the data structure is reconfigured to use the second monitor program to submit print jobs to one physical printer of the particular class.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

WINDOWS and WINDOWS NT are registered trademarks of Microsoft Corporation.

What is claimed is:

1. A method for reconfiguring multiple logical printers from using a first monitor program to using a second monitor program to communicate with one physical printer, wherein the monitor programs submit print jobs directed to a logical printer to one associated physical printer over a network, wherein at least one physical printer is capable of being associated with each logical printer, comprising:

determining a plurality of logical printers;

determining whether each physical printer associated with each of the plurality of logical printers is of a particular class;

indicating in a data structure each logical printer associated with one physical printer of the particular class; and reconfiguring each of the plurality of logical printers indicated in the data structure to use the second monitor program to submit print jobs to one physical printer of the particular class.

2. The method of claim 1, further comprising determining a network address of each physical printer, wherein determining whether each physical printer is of a particular class comprises using the determined network address of each physical printer to request information from the physical printer over the network, wherein the requested information indicates whether the physical printer is a member of the particular class.

3. The method of claim 1, wherein a port object provides an interface to a physical printer, wherein each logical printer is associated with one port object to interface with one physical printer, wherein one monitor program is associated with the port object, and wherein reconfiguring each of the plurality of logical printers to use the second monitor program comprises setting the logical printer to use one port object associated with the second port monitor to submit print jobs.

4. The method of claim 3, further comprising determining a network address of each physical printer by processing a name of one port object associated with the first monitor program providing the connection between the physical printer and associated logical printer, wherein determining whether each physical printer is of a particular class comprises using the determined network address of each physical printer to request information from the physical printer over the network, wherein the requested information indicates whether the physical printer is a member of the particular class.

5. The method of claim 3, further comprising:

determining, for each logical printer, each port object associated with the logical printer, and wherein determining whether each physical printer is of a particular class comprises determining whether each physical printer associated with each determined port object is of the particular class.

6. The method of claim 3, wherein reconfiguring the plurality of logical printers comprises:
   creating a new port associated with the second monitor program for each logical printer; and
   reconfiguring each of the logical printers indicated in the data structure to use the new port for printing.

7. The method of claim 6, further comprising indicating in the data structure, for each logical printer, the new port using the second monitor program, wherein the data structure is processed to determine the new port to assign to each logical printer.

8. The method of claim 7, wherein a separate thread is initiated to perform the operations of setting the logical printers to use the new ports as indicated in the data structure.

9. The method of claim 6, further comprising:
   determining ports associated with each logical printer that are replaced by the new port; and
   deleting, for each logical printer, all the determined ports.

10. A system for reconfiguring multiple logical printers from using a first monitor program to using a second monitor program to communicate with one physical printer, wherein the monitor programs submit print jobs directed to a logical printer to one associated physical printer over a network, wherein at least one physical printer is capable of being associated with each logical printer, comprising:
    means for determining a plurality of logical printers;
    means for determining whether each physical printer associated with each of the plurality of logical printers is of a particular class;
    means for indicating in a data structure each logical printer associated with one physical printer of the particular class; and
    means for reconfiguring each of the plurality of logical printers indicated in the data structure to use the second monitor program to submit print jobs to one physical printer of the particular class.

11. The system of claim 10, further comprising means for determining a network address of each physical printer, wherein the means for determining whether each physical printer is of a particular class comprises using the determined network address of each physical printer to request information from the physical printer over the network, wherein the requested information indicates whether the physical printer is a member of the particular class.

12. The system of claim 10, wherein a port object provides an interface to a physical printer, wherein each logical printer is associated with one port object to interface with one physical printer, wherein one monitor program is associated with the port object, and wherein the means for reconfiguring each of the plurality of logical printers to use the second monitor program comprises setting the logical printer to use one port object associated with the second port monitor to submit print jobs.

13. The system of claim 12, further comprising means for determining a network address of each physical printer by processing a name of one port object associated with the first monitor program providing the connection between the physical printer and associated logical printer, wherein the means for determining whether each physical printer is of a particular class comprises using the determined network address of each physical printer to request information from the physical printer over the network, wherein the requested information indicates whether the physical printer is a member of the particular class.

14. The system of claim 12, further comprising:
    means for determining, for each logical printer, each port object associated with the logical printer, and wherein the means for determining whether each physical printer is of a particular class comprises determining whether each physical printer associated with each determined port object is of the particular class.

15. The system of claim 12, wherein the means for reconfiguring the plurality of logical printers comprises:
    means for creating a new port associated with the second monitor program for each logical printer, and
    means for reconfiguring each of the logical printers indicated in the data structure to use the new port for printing.

16. The system of claim 15, further comprising means for indicating in the data structure, for each logical printer, the new port using the second monitor program, wherein the data structure is processed to determine the new port to assign to each logical printer.

17. The system of claim 16, wherein a separate thread is initiated to perform the operations of setting the logical printers to use the new ports as indicated in the data structure.

18. The system of claim 15, further comprising:
    means for determining ports associated with each logical printer that are replaced by the new port; and
    means for deleting, for each logical printer, all the determined ports.

19. An article of manufacture for use in reconfiguring multiple logical printers from using a first monitor program to using a second monitor program to communicate with one physical printer, wherein the monitor programs submit print jobs directed to a logical printer to one associated physical printer over a network, wherein at least one physical printer is capable of being associated with each logical printer, the article of manufacture comprising computer usable media including at least one computer program embedded therein that causes the computer to perform:
    determining a plurality of logical printers;
    determining whether each physical printer associated with each of the plurality of logical printers is of a particular class;
    indicating in a data structure each logical printer associated with one physical printer of the particular class; and
    reconfiguring each of the plurality of logical printers indicated in the data structure to use the second monitor program to submit print jobs to one physical printer of the particular class.

20. The article of manufacture of claim 19, further comprising determining a network address of each physical printer, wherein determining whether each physical printer is of a particular class comprises using the determined network address of each physical printer to request information from the physical printer over the network, wherein the requested information indicates whether the physical printer is a member of the particular class.

21. The article of manufacture of claim 19, wherein a port object provides an interface to a physical printer, wherein each logical printer is associated with one port object to interface with one physical printer, wherein one monitor program is associated with the port object, and wherein reconfiguring each of the plurality of logical printers to use the second monitor program comprises setting the logical printer to use one port object associated with the second port monitor to submit print jobs.

22. The article of manufacture of claim 21, further comprising determining a network address of each physical printer by processing a name of one port object associated with the first monitor program providing the connection between the physical printer and associated logical printer, wherein determining whether each physical printer is of a particular class comprises using the determined network address of each physical printer to request information from the physical printer over the network, wherein the requested information indicates whether the physical printer is a member of the particular class.

23. The article of manufacture of claim 21, further comprising:

determining, for each logical printer, each port object associated with the logical printer, and wherein determining whether each physical printer is of a particular class comprises determining whether each physical printer associated with each determined port object is of the particular class.

24. The article of manufacture of claim 21, wherein reconfiguring the plurality of logical printers comprises:

creating a new port associated with the second monitor program for each logical printer; and reconfiguring each of the logical printers indicated in the data structure to use the new port for printing.

25. The article of manufacture of claim 24, further comprising indicating in the data structure, for each logical printer, the new port using the second monitor program, wherein the data structure is processed to determine the new port to assign to each logical printer.

26. The article of manufacture of claim 25, wherein a separate thread is initiated to perform the operations of setting the logical printers to use the new ports as indicated in the data structure.

27. The article of manufacture of claim 24, further comprising:

determining ports associated with each logical printer that are replaced by the new port; and deleting, for each logical printer, all the determined ports.

* * * * *